United States Patent
Xu

(10) Patent No.: US 8,902,559 B2
(45) Date of Patent: Dec. 2, 2014

(54) PORTABLE EQUIPOTENTIAL GRID

(71) Applicant: Wilsun Xu, Edmonton (CA)

(72) Inventor: Wilsun Xu, Edmonton (CA)

(*) Notice: Subject to any disclaimer, the term of this patent is extended or adjusted under 35 U.S.C. 154(b) by 0 days.

(21) Appl. No.: 13/860,348

(22) Filed: Apr. 10, 2013

(65) Prior Publication Data

US 2014/0090885 A1 Apr. 3, 2014

Related U.S. Application Data

(60) Provisional application No. 61/707,382, filed on Sep. 28, 2012.

(51) Int. Cl.
*H05F 3/02* (2006.01)
*H01B 5/00* (2006.01)
*H02G 1/00* (2006.01)

(52) U.S. Cl.
CPC ............... *H01B 5/002* (2013.01); *H02G 1/00* (2013.01); *H05F 3/025* (2013.01)
USPC ........................................................ 361/220

(58) Field of Classification Search
USPC ........................................................ 361/220
See application file for complete search history.

(56) References Cited

U.S. PATENT DOCUMENTS

| 2,844,696 | A | * | 7/1958 | Custer, Jr. | 219/213 |
| 5,317,476 | A | * | 5/1994 | Wallace et al. | 361/220 |
| 5,835,332 | A |  | 11/1998 | White et al. |  |
| 6,477,027 | B1 |  | 11/2002 | McKelvy |  |
| 7,535,132 | B2 | * | 5/2009 | Devine et al. | 307/147 |
| 7,645,962 | B2 | * | 1/2010 | Krossa et al. | 219/541 |
| 2004/0211629 | A1 | * | 10/2004 | Lauch | 187/313 |
| 2007/0161303 | A1 | * | 7/2007 | Knightley | 442/32 |
| 2007/0221660 | A1 | * | 9/2007 | Krossa et al. | 219/541 |
| 2013/0033121 | A1 | * | 2/2013 | Simpson | 307/326 |

* cited by examiner

*Primary Examiner* — Ronald W Leja
(74) *Attorney, Agent, or Firm* — Anthony R. Lambert

(57) ABSTRACT

A portable grid for creating an equipotential zone that comprises at least two portable conductive elements. Each element comprises an electrically conducting platform forming a separation barrier with a working surface such as a ground surface. The elements may be joined electrically and mechanically. By joining multiple such elements, a variable size equipotential zone can be created. The portability of the zone is ensured as the zone can be disassembled to individual elements that can be carried and stored by the workers.

15 Claims, 5 Drawing Sheets

PORTABLE EQUIPOTENTIAL GRID

CROSS-REFERENCE TO RELATED APPLICATIONS

This application claims the benefit under 35 USC 119(e) of U.S. provisional application Ser. No. 61/707,382 filed Sep. 28, 2012.

TECHNICAL FIELD

A portable grid that can create an equipotential zone for workers working nearby an electrical structure. The portable grid is specifically designed for protecting such workers from exposure to hazardous voltage coming from the electrical structure.

BACKGROUND

Electrical workers and others working nearby an electrical structure such as overhead power lines, underground cables or switching cubicles can get in contact with an electrically energized object accidentally. This object can introduce a dangerously high voltage to the body of the worker. If the worker stands on the ground, the voltage difference (i.e. voltage potential) between the contact point and the worker's foot can drive a large current flowing through his/her body, leading to electrocution. One of the effective ways to mitigate such a risk is to create an equipotential (equal-voltage-potential) zone for the worker, as illustrated in FIG. 1. Working inside this zone, the worker will not experience the voltage potential between any parts of his body and, as a result, no or little current can flow through the body. Therefore, equipotential zone is a very important means to create safe work environment for such workers.

There is a few ways to create such an equipotential zone. For example, the worksite can be covered by a metal plate for the worker to stand on. The plate is bonded to any structure that could be energized and be contacted by the worker. However, such an approach is not practical as it imposes many constraints to the workers. Furthermore, a large metal plate that can cover the worksite or a large part of it lacks portability. What industry needs is a device that is portable and can create an equipotential zone for a wide variety of worksites and working conditions.

In response to this need, U.S. Pat. No. 6,477,027B1 and U.S. Pat. No. 5,835,332 presented a portable equipotential mat. It comprises a flexible base having a conductive mesh attached to a surface of the base. A preferred material for the base is a vinyl/polyester fabric and the conductive mesh is manufactured from high ampacity tinned copper braid. In recent years, the effectiveness of such an equipotential mat has been questioned by industry. It is clear that the conductive mesh cannot create an equipotential zone since there are open spaces inside the mesh. If a worker's foot happens to step on the space instead of the conductive braid, the foot will be in ground potential which is different from the potential of the conductive braid when the mat is energized. Note that the base is not treated as an insulating material and has not been claimed as dielectric in the patents. The issue here is if the potential difference is small enough so that the area covered by the mat can still be considered as an equipotential zone for practical purposes. Unfortunately, research results have shown that the potential difference can be huge, such as 8 kilovolts when the mat is energized by a 25 kilovolt source. In addition, the mat has other problems. One of them is that the braid can be easily worn out which limits the conductiveness of the mesh. Another is that it is very difficult to inspect the integrity of the mat from maintenance perspective. As a result of these findings, industry is looking for alternative methods or devices to create portable equipotential zone.

SUMMARY

In an embodiment, there is disclosed an apparatus for creating a portable equipotential zone in or adjacent a structure that includes energized equipment, the apparatus comprising at least two electrically conductive elements each with surfaces for people to stand or lean on, an electrical connector connecting the two electrically conductive elements electrically and a bonding cable for connecting the apparatus to the structure.

In another embodiment, there is disclosed an apparatus for creating a portable equipotential zone in or adjacent a structure that includes energized equipment having a differential potential from a working surface, the apparatus comprising a first electrically conducting platform forming a separation barrier between a person standing or leaning on the platform and the working surface, a second electrically conducting platform forming a separation barrier between a person standing or leaning on the platform and the working surface, the second electrically conducting platform being electrically connected to the first electrically conducting platform and a bonding cable for connecting the apparatus to the structure.

In various embodiments, there may be included one or more of the following: the at least two electrically conductive elements are in addition mechanically connected; the at least two electrically conductive elements are mechanically connected at least by a pivoting element; the pivoting element is a hinge; the at least two electrically conductive elements have openings; the at least two electrically conductive elements form a grid pattern; the at least two electrically conductive elements are foldable relative to one another to be arranged between a portable stacked configuration and an extensive ground cover.

BRIEF DESCRIPTION OF THE DRAWINGS

A portable grid will now be described by way of example only, with reference to the following drawings:

FIG. 2b shows a top view of the embodiment of FIG. 2a.

DETAILED DESCRIPTION

There is described here a portable grid for creating an equipotential zone that comprises at least two portable conductive elements. Each element comprises an electrically conducting platform forming a separation barrier with a working surface such as a ground surface. The elements may be joined electrically and mechanically. By joining multiple such elements, a variable size equipotential zone can be created. The portability of the zone is ensured as the zone can be disassembled to individual elements that can be carried and stored by the workers.

Figure 1:
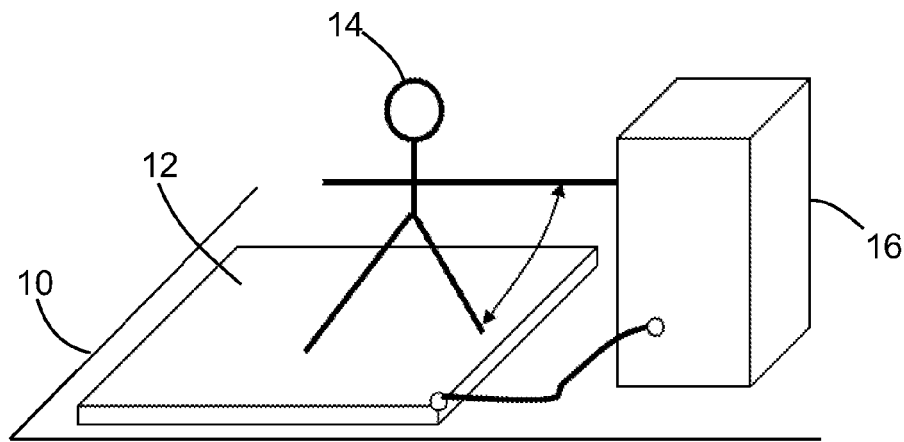
FIG. 1 shows the concept of equipotential zone.

Look firstly at the principle of equipotential zone, shown in FIG. 1. A conductive plate 12 is placed on the ground (working) surface 10 and the worker 14 stands on it. The conductive plate 12 is bonded to an electrical structure 16 with which the worker 14 is in contact. If the electrical structure 16 is energized accidentally, a voltage will propagate to both the structure and the conductive plate 12. The body of the worker 14 will not experience potential difference between his/her foot and hand. So there is no current flowing through the body and the worker is safe.

Figure 2A:
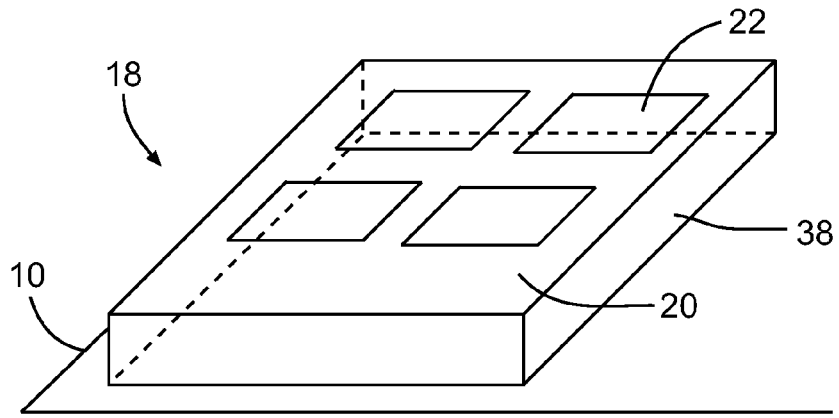
FIG. 2a shows an embodiment of a conductive element.
Figure 2B:
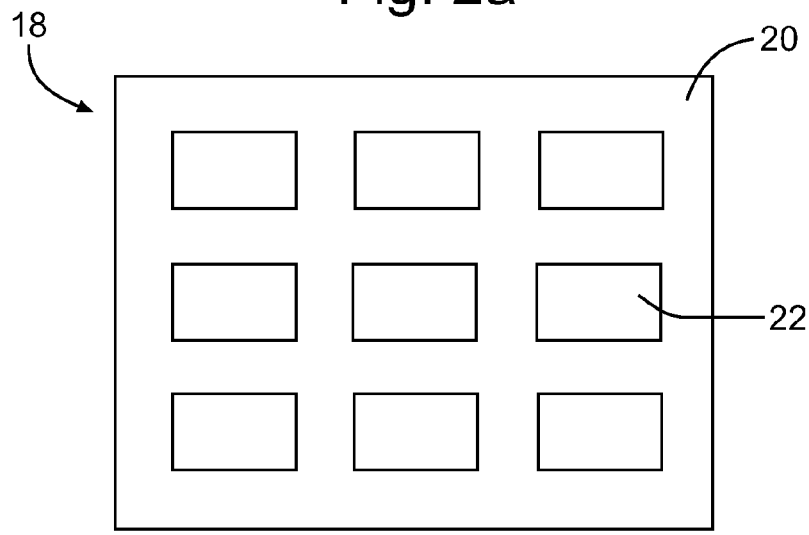

An embodiment of the conductive element 18 proposed here is shown in FIG. 2a, and a top view of the embodiment shown in FIG. 2b. The element forms an electrically conducting platform forming a separation barrier from a working surface 10. The top surfaces of the various elements disclosed are preferably conducting or contain connected conducting elements. In some cases, the top surface 20 may be continuous without openings. Preferably this element is made entirely by light-weight conductive materials such as aluminum. Its size is small enough, such as 60 cm by 60 cm, to facilitate portability. The top surface 20 of an exemplary element 18 has open spaces 22 shown in a tile pattern. This is intended to reduce its weight and save material. It is important to note that the open space 22 should be small enough so that a worker can firmly and safely stand on the top surface without forming a hazard such as a tripping hazard. A small open space also ensures that the voltage difference between the open space and the conductive surface is small enough without creating electrical hazard. The size of the opening can be 2 cm, 5 cm or 10 cm or more diagonal. It is determined by considering, for example, the following factors: the voltage difference between the ground surface exposed in the opening and the conductive surface, the thickness and height of the conductive surface, the cost of material, the insulating capability of the footwear, and so on. Similarly, the thickness of the conductive surface is determined according to factors such as the mechanical strength of the material, the conductivity of the material, the current to be carried by the structure, the cost and so on. Optionally the top surface 20 may be raised above the ground (working) surface 10 with the help of a support frame 38 to further improve electrical safety. The frame is preferably made of same material to save manufacturing cost and to be also conductive, but it can be made of other materials such as non-conductive type. The purpose of raising the conductive surface to a sufficient height (such as 1, 2 or 3 cm) is to prevent the worker's foot or a part of the foot from contacting the working (ground) surface which can further improve safety. In some instances, some contact of the foot to the ground may be acceptable if the voltage difference is small enough. The element should have sufficient mechanical strength to withstand the weight of one or two workers or as many workers as will use the element.

Figure 2C:
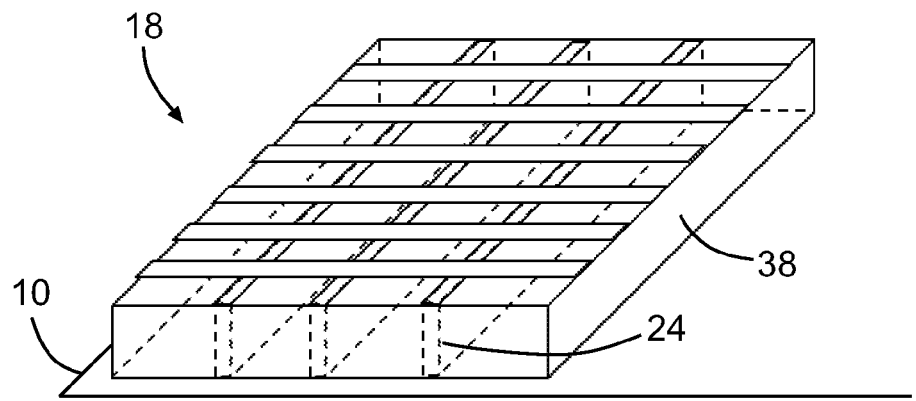
FIG. 2c shows another embodiment of a conductive element.
Figure 2D:
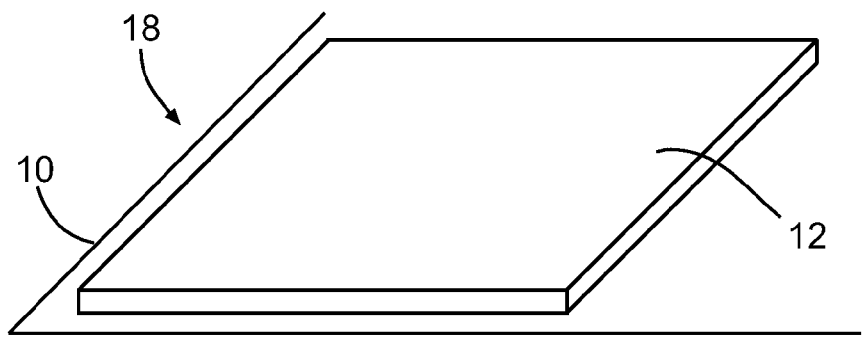
FIG. 2d shows yet another embodiment of a conductive element.

FIG. 2c shows an alternative embodiment of the conductive element 18 where the support frame 38 contains beams 24. This is just to increase the mechanical strength of the element so it can support the heavy weighted workers without deformation. FIG. 2d shows an alternative embodiment of the conductive element 18 where the element is simply a conductive plate 12.

Figure 2E:
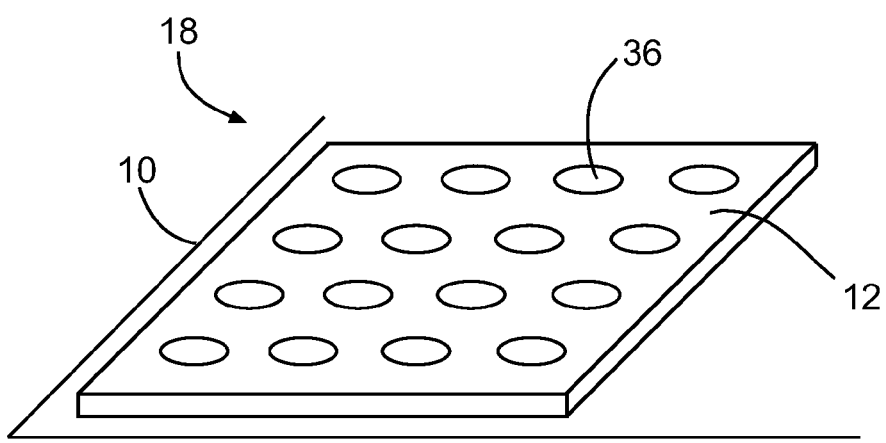
FIG. 2e shows yet another embodiment of a conductive element.

FIG. 2e shows yet another alternative embodiment of the conductive element 18 where the element is simply a conductive plate with small openings. Small openings 36 arranged in a grid pattern are also acceptable in the plate 12 as long as the voltage difference between the open space of the hole 36 and the conductive surface 18 is small enough not to cause electrical safety concerns. The acceptable voltage difference varies from a few volts to a few kilovolts depending on the insulation property of the footwear.

Figure 3:
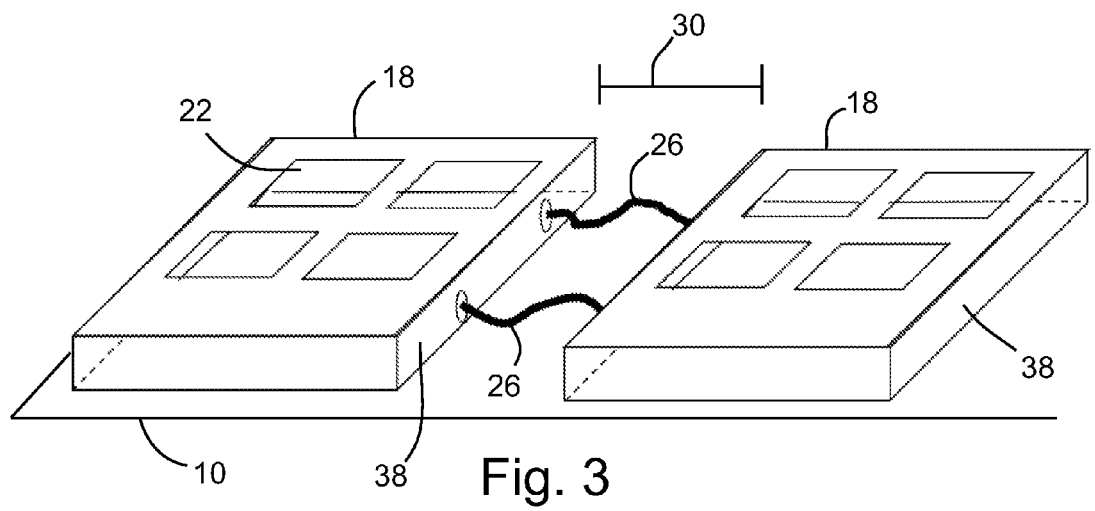
FIG. 3 shows an embodiment of connecting two elements.

FIG. 3 shows one of the methods to connect two elements 18 electrically and mechanically. The elements are raised above the working surface 10 with the help of the support frame 38. In this embodiment, two flexible conductors 26 are bonded to both elements through, for example, bolts. The conductors 26 are flexible so that the two elements 18 don't have to be placed on the flat surface. Such flexibility is needed when a worker works, for example, in a space-limited trench. The walls of the trench must also covered by equipotential elements. Furthermore, the two elements should not be separated too far apart. This is to prevent a worker's foot or other body parts from contacting the ground surface 10 between the two elements 18. Recommended gap 30 between the elements 18 is less than for example 5, 10, 20 or 30 cm depending on the application. Bonding of the two elements 18 is done on site by the worker. The bonding serves two purposes. One is to create an electrical connection between the two elements, especially their conductive surface. Another is to create a mechanical linkage between them so that they don't drift apart when the worker performs his/her job functions. The length of the gap 30 between the elements 18 is controlled by the length of the conductors 26.

Figure 4:
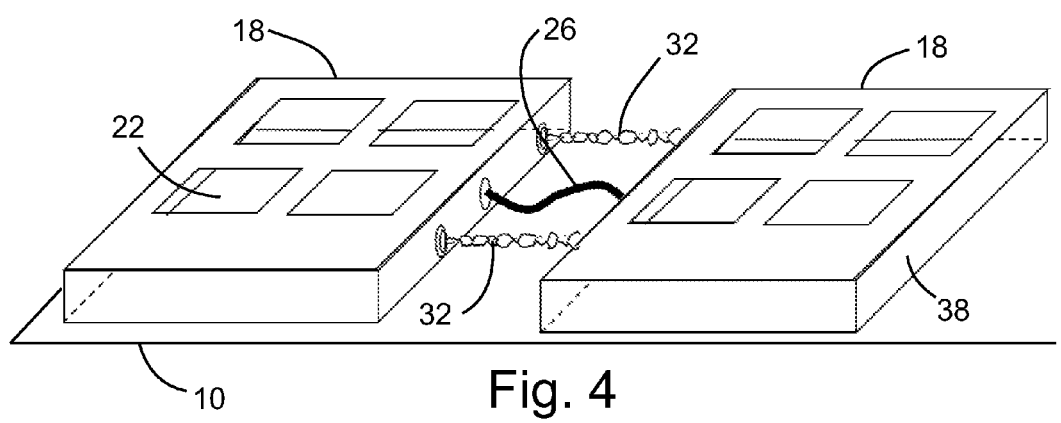
FIG. 4 shows another embodiment of connecting two elements.

FIG. 4 shows another method of connecting the two elements 18 raised above the working surface 10 with the help of the support frame 38. In this method, two chains 32 with sufficient mechanical strength are hooked to the two elements 18. They serve the purpose of mechanical connection. The electrical connection is done through bonding one flexible conductor 26 to the two elements 18. The length of the chain 32 controls the separation of the two elements 18.

Figure 5:
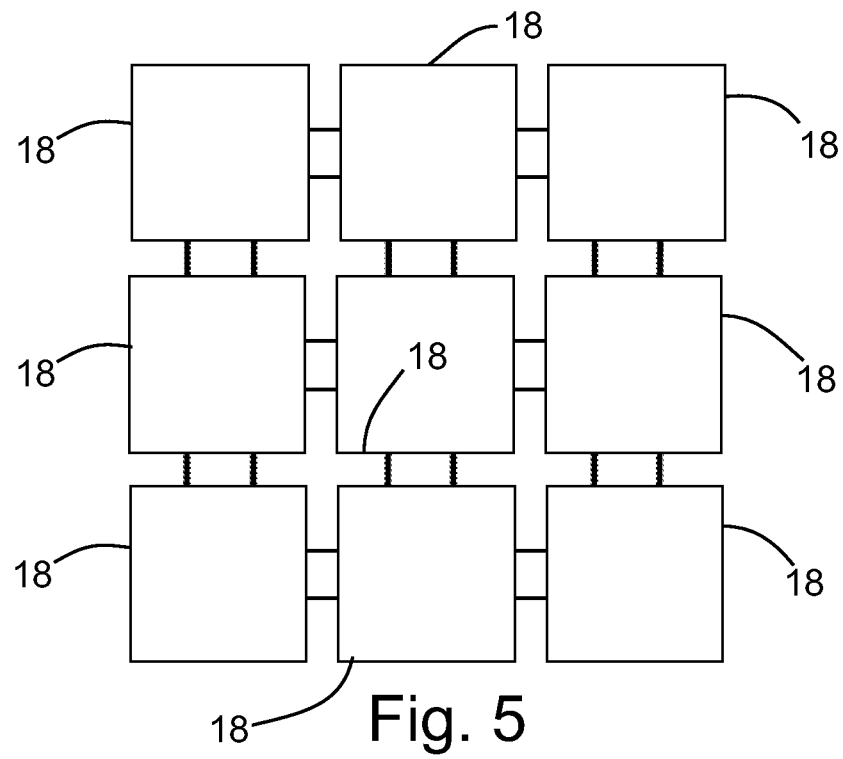
FIG. 5 shows how an equipotential zone is created by multiple bonded elements.

In FIG. 5, multiple elements 18 are connected together to form an equipotential zone of required size and shapes. Note that one of the elements is bonded to the structure that could be energized accidentally.

Figure 6:
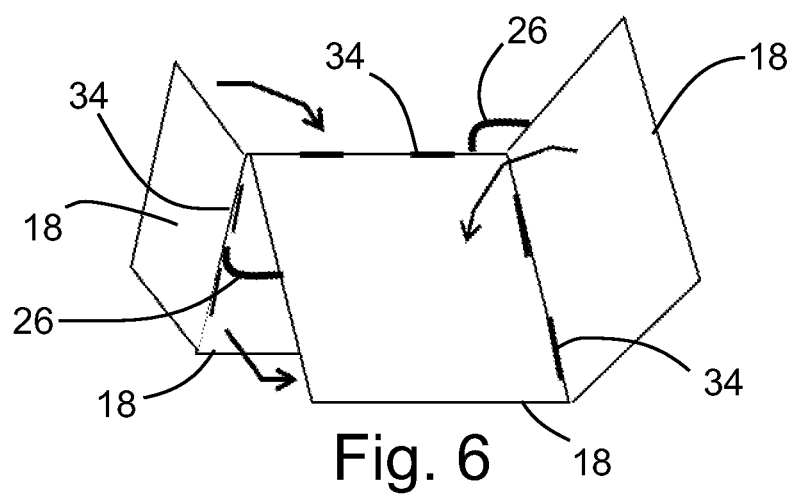
FIG. 6 shows another embodiment of creating equipotential zone.

FIG. 6 shows that the conductive elements 18 can also be joined by hinges 34. They can be folded to facilitate mobility and unfolded to create an equal potential zone. For this embodiment and depending on the electric current carrying capability of the hinges, a flexible electric cable 26 may or may not be needed to bond any two of the elements electrically. Again, one of the elements is bonded to the structure that could be energized accidentally.

Figure 7:
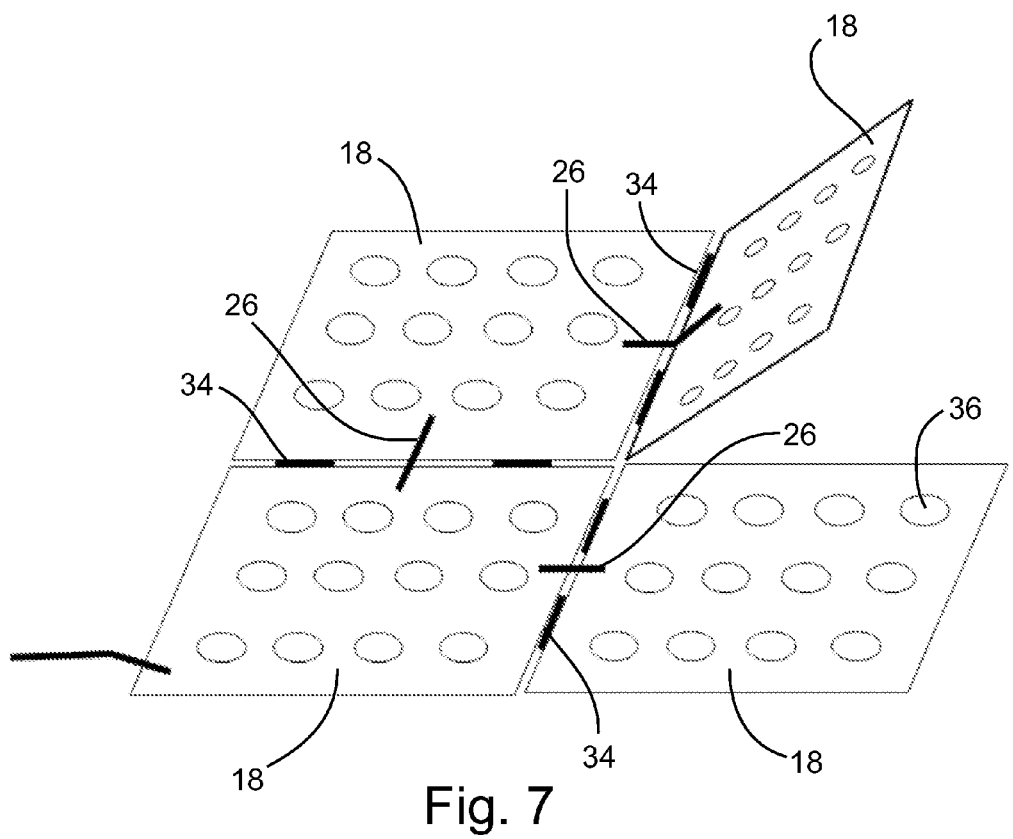
FIG. 7 shows yet another embodiment of creating equipotential zone.

FIG. 7 shows conductive elements 18 joined by hinges 34. The elements 18 have openings 36. The elements 18 can also be folded to facilitate mobility and unfolded to create an equal potential zone. For this embodiment and depending on the electric current carrying capability of the hinges a flexible electric cable may or may not be needed to bond any two of the elements electrically. Again, one of the elements is bonded to the structure that could be energized accidentally.

The detailed design of the conductive elements can vary for a number of reasons, such as cosmetic considerations, manufacturing easiness, and assembling convenience. For example, the location of the bonding points can vary. The forms of the bonding components (conductors, chains or hinges) can also vary including how they are connected to the elements. Furthermore, the equipotential zone formed with the proposed scheme must have certain electrical properties such as the capability of withstanding large fault currents and the capability of having small resistance measured from one corner of the zone to another.

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

What is claimed is:

1. An apparatus for creating a portable equipotential zone in or adjacent a structure that includes energized equipment, the apparatus comprising
    at least two electrically conductive elements each with surfaces for people to stand or lean on;
    an electrical connector connecting the two electrically conductive elements electrically; and
    a bonding cable for connecting the apparatus to the structure;
    in which the at least two electrically conductive elements are mechanically connected at least by a hinge.

2. The apparatus of claim 1 in which the at least two electrically conductive elements have openings.

3. The apparatus of claim 1 in which the at least two electrically conductive elements form a grid pattern.

4. The apparatus of claim 3 in which the at least two electrically conductive elements are foldable relative to one another to be arranged between a portable stacked configuration and an extensive ground cover.

5. An apparatus for creating a portable equipotential zone in or adjacent a structure that includes energized equipment having a differential potential from a working surface, the apparatus comprising:
    a first electrically conducting platform forming a separation barrier between a person standing or leaning on the platform and the working surface;
    a second electrically conducting platform forming a separation barrier between a person standing or leaning on the platform and the working surface, the second electrically conducting platform being electrically connected to the first electrically conducting platform; and
    a bonding cable for connecting the apparatus to the structure;
    in which the second electrically conducting platform and the first electrically conducting platform are mechanically connected at least by a hinge.

6. The apparatus of claim 5 in which the second electrically conducting platform and the first electrically conducting platform each have openings.

7. The apparatus of claim 5 in which the second electrically conducting platform and the first electrically conducting platform are electrically connected by at least a cable.

8. The apparatus of claim 5 in which the second electrically conducting platform and the first electrically conducting platform form part of a grid pattern of like elements.

9. The apparatus of claim 8 in which the second electrically conducting platform and the first electrically conducting platform are foldable relative to one another to be arranged between a portable stacked configuration and an extensive working surface cover.

10. The apparatus of claim 5 in which the second electrically conducting platform and the first electrically conducting platform are separated by less than 30 cm.

11. The apparatus of claim 5 in which the working surface is a ground surface.

12. An apparatus for creating a portable equipotential zone in or adjacent a structure that includes energized equipment having a differential potential from a working surface, the apparatus comprising:
    a first electrically conducting platform forming a separation barrier between a person standing or leaning on the platform and the working surface;
    a second electrically conducting platform forming a separation barrier between a person standing or leaning on the platform and the working surface, the second electrically conducting platform being electrically connected to the first electrically conducting platform; and
    a bonding cable for connecting the apparatus to the structure;
    in which the second electrically conducting platform and the first electrically conducting platform form part of a grid pattern of like elements; and
    in which the second electrically conducting platform and the first electrically conducting platform are foldable relative to one another to be arranged between a portable stacked configuration and an extensive working surface cover.

13. The apparatus of claim 12 in which the second electrically conducting platform and the first electrically conducting platform are separated by less than 30 cm.

14. The apparatus of claim 12 in which the working surface is a ground surface.

15. An apparatus for creating a portable equipotential zone in or adjacent a structure that includes energized equipment, the apparatus comprising
    at least two electrically conductive elements each with surfaces for people to stand or lean on;
    an electrical connector connecting the two electrically conductive elements electrically; and
    a bonding cable for connecting the apparatus to the structure;
    in which the at least two electrically conductive elements form a grid pattern; and
    in which the at least two electrically conductive elements are foldable relative to one another to be arranged between a portable stacked configuration and an extensive ground cover.

* * * * *